United States Patent

[11] 3,536,101

| [72] | Inventor | Kenneth O. Bosworth<br>121 Vinnicum Road, Swansea,<br>Massachusetts 02777 |
|---|---|---|
| [21] | Appl. No. | 778,400 |
| [22] | Filed | Nov. 25, 1968 |
| [45] | Patented | Oct. 27, 1970 |

[54] SELECTOR VALVE
8 Claims, 9 Drawing Figs.

[52] U.S. Cl. .................................................. 137/315,
137/625.47, 251/287, 251/317
[51] Int. Cl. ........................................................ F16k 43/00
[50] Field of Search............................................ 137/315,
625.41, 625.47; 251/162, 163, 164, 188, 192, 284,
286, 287, 309, 310, 311, 312, 317, 368; 29/157.1,
436, 426, 453

[56] References Cited
UNITED STATES PATENTS

| 1,299,428 | 4/1919 | Cheeks ......................... | 251/309X |
| 2,640,676 | 6/1953 | Habgood ....................... | 251/192 |
| 3,012,752 | 12/1961 | Buck .............................. | 137/625.41X |
| 3,192,943 | 7/1965 | Moen ............................. | 251/192X |
| 3,467,356 | 9/1969 | Mueller ......................... | 251/164 |

Primary Examiner—Clarence R. Gordon
Assistant Examiner—David R. Matthews
Attorney—Salter and Michaelson ABSTRACT: A valve having a housing with an interior chamber that is provided with two or more conduits. A valving element is rotated by means of a handle to effect communication between the inlet conduit and a selected one of the outlet conduits. The valving element comprises a circular disc which snap fits into assembly with the housing when the valving element is pressed downwardly thereinto. The floor of the housing is formed with a special boss which journals a lower gate formed on the valving element. The gate, and a pair of cam shoulders adjacent the boss, engage to establish opposite limiting positions for the valving element, as well as to cam it upwardly out of snap fit assembly with the housing when the valving element is rotated overridingly past either one of the limiting positions. The valving element is provided with a replaceable sealing seat.

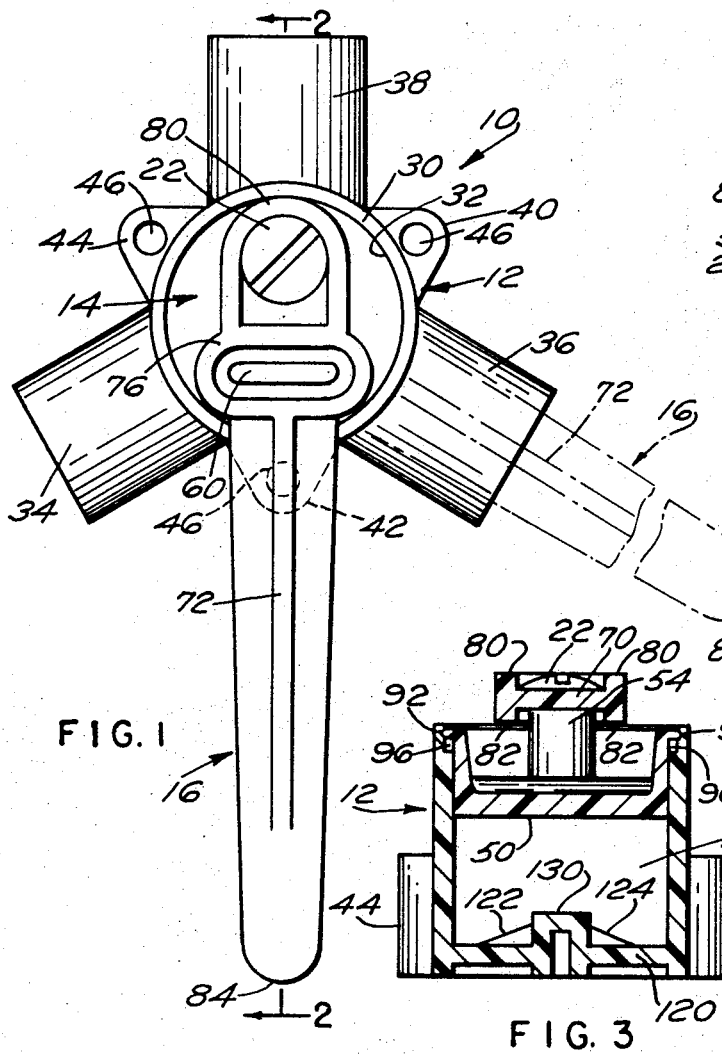
FIG. 1
FIG. 3
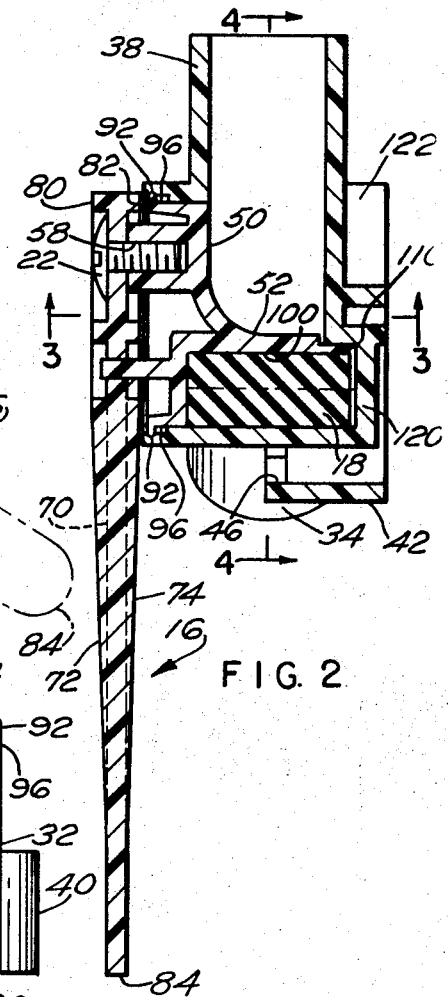
FIG. 2
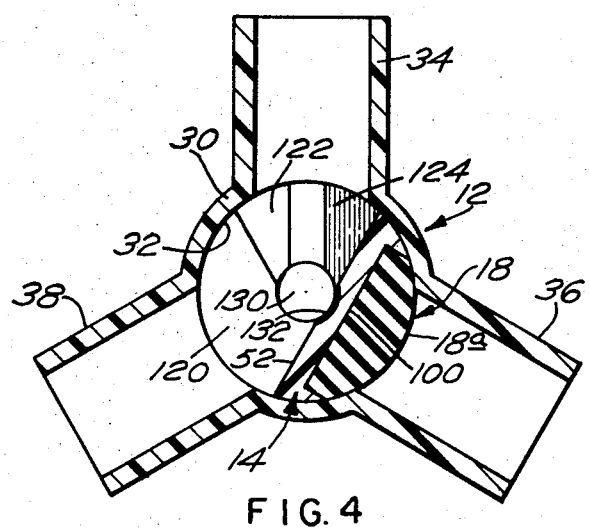
FIG. 4
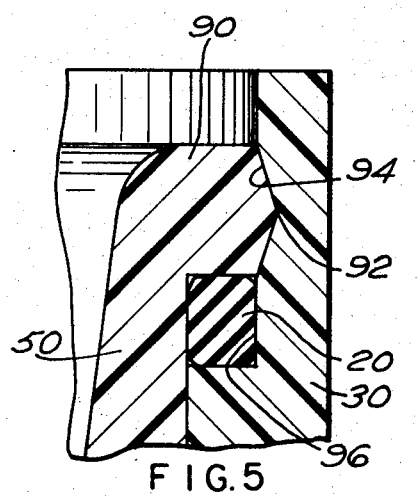
FIG. 5
INVENTOR
KENNETH O. BOSWORTH
BY Salter & Michaelson
ATTORNEYS Patented Oct. 27, 1970 3,536,101

INVENTOR
KENNETH O. BOSWORTH

BY Salter & Michaelson
ATTORNEYS

3,536,101

1
SELECTOR VALVE

FIELD OF THE INVENTION

This invention relates generally to valves, and especially to a selector valve particularly adapted for marine and industrial applications in that it is molded of impervious plastic materials and is easily disassembled to effect repair or replacement of parts.

THE PRIOR ART

In various marine applications, there is a need for a selector valve of the kind comprising a housing having one common port and two alternative ports. A valving element rotates within the housing to divert fluid from the common port to one or the other of the alternative ports, as desired. In marine environments such valves are used to control the flow of various corrosive liquids such as sea water or fuel and are frequently used in connection with the pumping of bilge water and sewage. In industrial applications they may control the flow of other difficult fluids such as ink or various chemical reagents.

In addition to the problems that may be imposed by the valved fluid itself, structures of the type described often have to withstand abrasion and clogging as a result of solid particles and semisolid materials entering along with the fluid. For example, in marine applications sand, gravel, mud, wastes, seaweed and the like may enter the valve. These materials have a tendency to clog the valve unless it is designed to provide ample passage room between the inlet and outlet conduits. In addition some of these materials have an abrasive effect upon the valve parts, particularly those relatively soft, resilient parts which are depended upon to provide effective sealing when the valve is in closed position.

As a result of these difficult service conditions, it is desirable for a valve of this type to consist of a small number of parts, each molded of an inexpensive but chemically resistant material which can withstand corrosive fluids. It is also desirable that such a valve be easily disassembled so that the ravages of difficult service conditions can be repaired more easily. In particular, it would be desirable for the sealing elements of the valve to be easily replaceable. It would also be desirable for such a valve to provide wider passages between the inlet and outlet conduits so as not to become clogged by gravel, seaweed sewage and other sizable particles.

SUMMARY OF THE INVENTION

Accordingly, the objects of this invention are to provide a selector valve having the advantages of molded construction, ease of disassembly, and ready replacement of parts, particularly sealing elements. Other objects of the invention are to combine various elements by integrally molding them with other parts of the valve. Another object is to provide a valve which provides minimal obstruction for solid and semisolid materials which must pass through it. Another object is to provide a maximum of resistance to corrosion and abrasion. Still another object is to provide a valve which is suitable either for vacuum or pressure service. Additional objects are light weight and low friction operation in a valve of the type described.

In accordance with these objectives, the invention provides a valve having a housing formed with a common port and two alternative ports. A valving element is press fit into rotatable assembly with the housing by forcing it downwardly into the interior chamber. A special formation of the floor of the housing provides both limiting of the travel of the valving element and also a ready means of camming the valving element out of assembly with the housing so that the valve can be disassembled without the need for tools of any kind.

The valve has numerous additional features and advantages, which may best be appreciated from the following drawings and detailed description.

Other objects, features and advantages of the invention shall become apparent as the description thereof proceeds when considered in connection with the accompanying illustrative drawing.

2
DESCRIPTION OF THE DRAWING

In the drawings which illustrate the best mode presently contemplated for carrying out the present invention:

FIG. 1 is a top plan view of the valve of this invention, showing two different positions of the operating handle thereof.

FIG. 2 is a sectional view of the same valve, taken along the lines 2–2 of FIG. 1, looking in the direction of the arrows.

FIG. 3 is a sectional view of the same valve, taken along the lines 3–3 of FIG. 2, looking in the direction of the arrows.

FIG. 4 is a sectional view of the same valve, taken along the lines 4–4 of FIG. 2, looking in the direction of the arrows.

FIG. 5 is an enlarged detail of a portion of FIG. 3.

The same reference characters refer to the same elements throughout the several views of the drawings.

DESCRIPTION OF THE INVENTION

Figure 6:
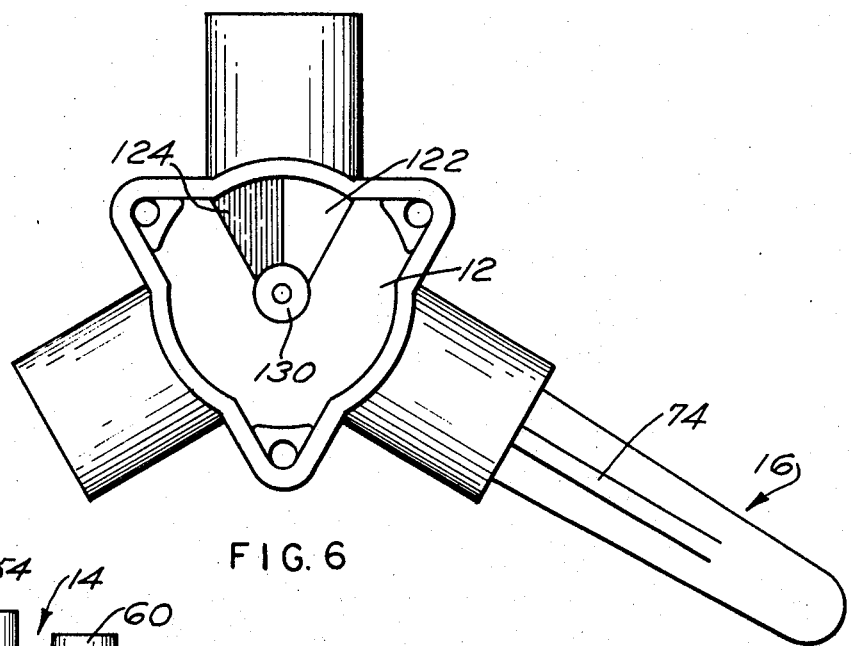
FIG. 6 is a bottom plan view of the same valve.

The design philosophy of the present valve requires that there be a limited number of separate parts, that each such part be molded of an inexpensive and corrosion resistant plastic material, and that each part combine a maximum number of functions in a single body. In addition, the parts should be easily disassembled without the use of tools so that damaged parts can be easily repaired or replaced. In particular, sealing members should be easily replaceable as required by wear or different conditions of service.

In accordance with this design philosophy, the valve 10 of this invention comprises only six parts. There is a housing 12, a valving element 14 which rotates within the housing 12 to perform the valving function, and a handle 16 by means of which the valving element may be manually rotated, each of which is a unitary body molded of a corrosion resistant light weight, abrasion resistant, high strength plastic material such as acetal resins. There is also a pair of replaceable resilient sealing elements 18 and 20 molded of a soft but corrosion resistant material such as Neoprene. The only other part required for the assembly of the valve 10 is a machine screw 22 which secures the handle 16 to the valving element 14.

Looking at each of these elements in greater detail, the housing 12 comprises an outer wall 30 defining a circular interior chamber 32. Integrally molded with the valve housing 12, and projecting radially outward therefrom at equally spaced angles, are fluid conduits 34, 36 and 38 all of which are in communication with chamber 32. Conduit 34 is a common pipe which brings the valve fluid into or out of the interior chamber 32. Conduits 36 and 38 are a pair of alternative pipes through one of which the valve fluid is directed, the choice of flow direction depending upon the position of the valving element 14.

In keeping with the design philosophy of this valve, three mounting lugs 40, 42 and 44 are integrally molded with the housing 12 and project outwardly therefrom between the conduits 34, 36 and 38. The mounting lugs are provided with respective fastener holes 46 through which conventional fasteners can be inserted to secure the valve 10 in a desired location.

Figure 9:
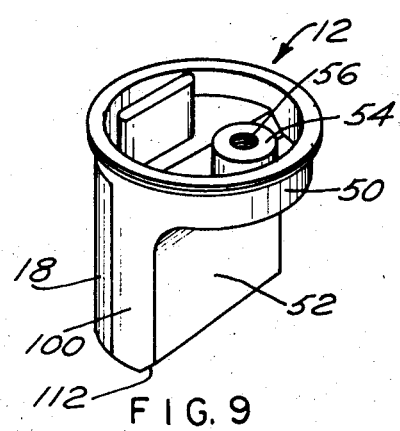
FIG. 9 is a perspective view of the same valving element.

As best seen in FIG. 9, the valving element 12 comprises a horizontal upper disc 50 of circular configuration from which depends a vertical gating element 52. This gate serves the function of blocking off one of the outlet or inlet pipes 36 or 38 and unblocking the other one, according to the selected position of the valving element 12. In order to secure the manual operating handle 16 to the top surface of the valving element disc 50, a boss 54 projects vertically upward therefrom and is provided with a tapped hole 56 to receive the fastening bolt 22 which passes through a suitable opening 58 formed in the handle 16. The disc 50 also has an upwardly projecting tongue 60 which interlocks with a suitably shaped opening 62 formed in the handle 16 to lock the handle 16 and valving element 12 together for rotation as a unit. The assembly of the handle 16 and valving element 12 is best seen in FIG. 2.

FIG. 2 also illustrates the detailed construction of the handle 16, which comprises a horizontal web 70 formed with an upwardly extending stiffening rib 72 and a downwardly extending stiffening rib 74. The two stiffening ribs widen into upper and lower loops 76 and 78 surrounding the opening 62 and tongue 60, and upper and lower stiffening loops 80 and 82 surrounding the opening 58 and fastening bolt 22. These stiffening structures serve to rigidify the handle 16 during turning thereof by a force normally exerted against the projecting end 84 of the handle to rotate the valving element 14. In FIG. 1 the handle 16 is seen in two distinct positions as a result of such rotation.

Figure 7:
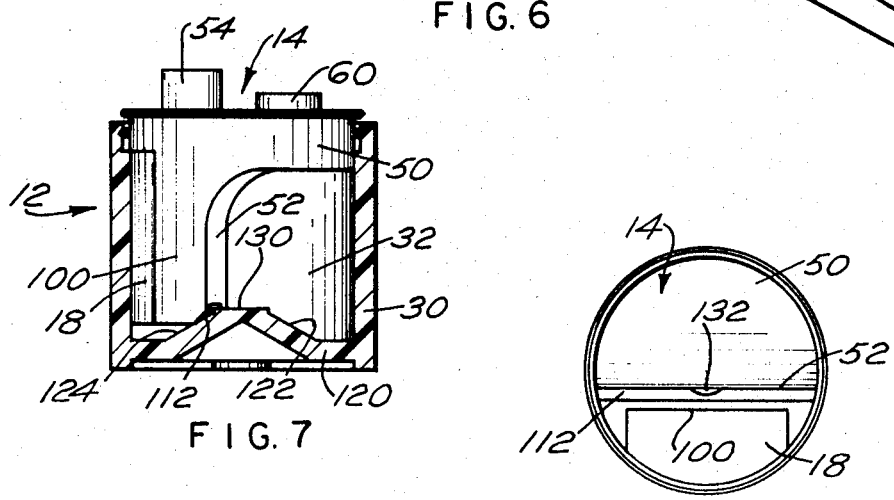
FIG. 7 is a partial view showing only a side elevational view of the rotatable valving element and a vertical section of the valve housing of the valve of the preceding FIGS.

As seen in FIGS. 2, 3 and 7, the valving element 12 is inserted downwardly into the interior 32 of the housing 12. When this is done, a strong downward pressure upon the valving element 14 will force it into a snap fitting assembled relationship with the valve housing 12. As best seen in the enlarged view of FIG. 5, the upper peripheral edge of the valving element disc 50 is formed with an outwardly extending annular flange 90, the point 92 of which forms the male element of a snap fit assembly. Cooperating with the male element 92 is an annular socket 94 formed in the interior surface of the valve housing wall 30. The inherent resilience and elastic memory of the plastic material of which the valve element 14 and valve housing 12 are molded permits sufficient momentary deformation for these two parts to be forced into and out of snapping assembly with each other. The mating of the circular bead 92 and socket 94 also provide a convenient bearing for the rotation of valving element 14 relative to the housing 12. The low friction properties of the Delrin material enable the valve element 14 to be turned relatively easily in this bearing.

Note also in the close up view of FIG. 5 that a relieved area 96 is formed on the inner surface of the housing wall 30 to accommodate the resilient O-ring 20 for fluid sealing. The O-ring 20 is accommodated immediately below the flange 90 of the valving element disc 50. In this location, O-ring 20 is protected by the disc 50 from abrasion by sand or other materials passing through the chamber 32.

As best seen in FIG. 4, the gate 52 of the valving element 14 is normally in position to block one of the alternate pipes. Under these conditions, the fluid entering the valve housing chamber 32 by means of the common pipe 34 exits through the unblocked pipe 38. However, by applying a torque to the manual operating handle 16 to rotate the valving element 14 within the chamber 32, the gate 52 is rotated into position to block the pipe 38 and unblock the pipe 36. In this way, the two-way valve 10 selects which valved fluid shall be free to flow through the valve to outlet pipe 36.

Figure 8:
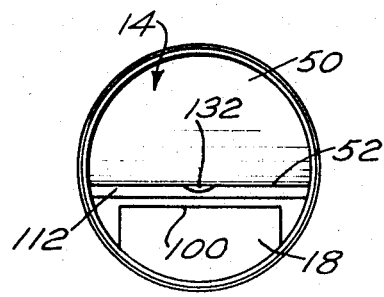
FIG. 8 is a bottom plan view of the valving element of the same valve.

It is best appreciated from FIGS. 4, 7 and 8 that the depending gate 52 is eccentrically located relative to the circular disc 50 of the valving element 14, and well away from the center of rotation of the disc. The advantage of this construction may be realized from FIG. 4 by noting that, as a consequence of this location, the gate 52 is set well back from the inlet pipe 34 and the unblocked outlet pipe 38 to provide minimal obstruction to the valved fluid as it passes through the chamber 32. This is particularly advantageous when solid or semisolid objects such as waste, gravel, mud, sand or seaweed must pass through the valve 10 without clogging it. Another advantage is that the abrasive effect of solid materials such as gravel and sand upon the depending gate 52 is minimized by its location.

In order to seal off the blocked pipe, e.g. the pipe 36 in FIG. 4, the rear of the depending gate 52 is formed with a socket 100 which frictionally retains sealing seat 18. The latter element has a cylindrical out surface 18a which frictionally engages against the interior of the valve housing wall 30 as element 14 and gate 52 rotate. In this location the sealing seat 18 is protected by gate 52 from abrasion by sand or other materials passing through the chamber 32. Whenever the sealing seat 18 ages, is corroded by the action of the valved fluid or becomes worn, it can easily be removed from its socket 100 and replaced by a new sealing seat 18. In the same way, different sealing seat materials can be selected to suit different applications.

However, in order to remove the valving element 14 so that the sealing seat 18 can be removed from its socket 100, it is necessary to extract the valving element 14 from its snap fit assembled relationship with the housing 12. In order to accomplish this without the use of any tools, the depending gate 52 is provided with a bevel 112, the function of which will now be explained.

The valve housing 12 has an integrally molded horizontal floor 120 which extends across the bottom of the valve housing chamber 32. This floor is formed with a camming element including a pair of inclined surfaces 122 and 124 which are positioned to abut against the bevel 112 of the gate 52. When the valving element 14 is fully rotated into position to block the pipe 36 and unblock the pipe 38, the gate bevel surface 112 abuts against the floor inclined surface 124. This engagement normally serves to establish the limit of operating travel of the valving element 14 in that particular direction. Similarly, when the valving element 14 is fully rotated to unblock the pipe 36 and block the pipe 38 instead, the gate bevel surface 112 abuts against the floor inclined surface 122, thus establishing the opposite limiting position of the valving element 14.

However, if additional pressure is put upon the manual operating handle 16 to override either of these limiting positions, the floor inclined surface 122 or 124 pushes upwardly against gate bevel surface 112 to cam the entire valving element 14 upwardly out of snap fit assembled relationship with the housing 12. Thus, by merely rotating the valving element to one of its limiting positions and forcing it beyond, the valve can be opened up and the valving element 14 removed using only ones hands. No special tools, indeed no tools of any kind, are required to disassemble the valve 10 in this manner. Once it is disassembled, it is a simple matter to replace the sealing seat 18 or the O-ring 20, or to clear any undesirable material which may have formed an obstruction within the chamber 32.

Subsequently the valve can be easily reassembled by lowering the valving element 14 into the interior 32 of the housing 12 and forcing it back downward into snap fit assembled relationship therewith, as previously described.

In keeping with the design philosophy of providing a minimum number of parts and making each such part perform a variety of functions, the central region of the floor 120 is provided with an upwardly projecting circular boss 130, and the lower end of the depending gate 52 is formed with a corresponding arcuate recess 132 located substantially at the center portion of bevel 112. When the valve is assembled, the arcuate recess 132 receives and enables the gate 52 to rest upon and rotate around the circular central boss 130 so that the valving element 14 is thereby journaled upon the valve of housing floor 120 as it rotates through its operational movement. This provides a second bearing for the rotation of the element 14, one which also benefits from the low friction properties of acetal resins.

It will now be appreciated that this valve is easily disassembled using only ones hands and does not require either special or general purpose tools of any kind. When so disassembled the sealing elements 18 and 20 can be easily replaced as a matter of normal maintenance, or different sealing means may be substituted to suit various service conditions. The valve has a minimum number of parts for ease of fabrication and to provide a relatively lightweight assembly. Because of this, each part performs a number of functions, and in particular the same surfaces which limit the valving element in its normal operational movement also serve to cam the valve open when disassembly is desired. The design of the valve also provides two bearings, both with minimal friction, for the rotation of the valving element relative to the housing, and both bearings are molded as an integral part of the valve housing and valving element. The valve is suitable for vacuum or pressure service, works in any position, and provides generous passages through which solid and semisolid materials can more easily travel, while isolating the sealing elements from physical abrasion. An additional advantage of the valve is that there are absolutely no metal parts in the interior of the valve housing where they could be subject to the action of corrosive or abrasive valve fluids or any solid material carried thereby. The valve in all these respects represents an advance over selector valves previously available.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims. For example any valve of the plug cock type with two or more ports or conduits may be similarly constructed.

I claim:

1. In a valve of the type including a valve housing defining an interior chamber having a floor, a port for introducing fluid into said chamber, at least one port for said fluid to exit from said chamber, a valving element rotatable within said chamber between two positions, said valving element in one of said positions blocking one of said ports to prevent flow of fluid through said valve and in said other positions unblocking said one port to permit fluid flow therethrough; the improvement comprising:

a. limiting means or said floor defining the limits of rotation of said valving element;
   b. cooperating means on said valving element and said valve housing whereby the former may be snap-seated into assembled relation with the latter;
   c. cam means on said valving element cooperating with said limiting means to stop movement of said valving element where normal force is applied to said element, but at the same time to cause disengagement of said element from said housing when sufficient force is applied to said element to cause said cam means to commence to override said limiting means.

2. A valve as in claim 1 wherein: said limiting means and said cam means comprise cooperating inclined surfaces.

3. A valve as in claim 1 further comprising: interengaging means integrally carried by said housing and element for rotatably mounting the latter in the former, said interengaging means comprising a boss and a recess receiving said boss.

4. A valve as in claim 1 wherein: said cooperating means comprises an annular bead and an annular socket snap receiving said bead.

5. A valve as in claim 1 wherein: said valving element has a depending gate extending chordally thereacross, said gate being located eccentrically of the axis of rotation of said element.

6. A valve as in claim 5 wherein: the outer chordal surface of said gate has a recess therein a resilient sealing member frictionally positioned in said recess whereby it may be readily removed therefrom when desired, said sealing member having an arcuate outer surface that makes frictional engagement with the interior wall of said chamber when the valving element is rotated with respect thereto.

7. A valve as in claim 1, wherein there are at least three ports in communication with said chamber, said limiting means being positioned so that when said valving element is moved to one limit of its travel, one of the ports will be completely blocked and the other ports completely unblocked, and when said element is moved to its other limit of travel, one of the other ports will be completely blocked and the remaining two ports completely unblocked.

8. A valve as in claim 1 wherein said valve housing and valving element are molded of plastic construction, said limiting means, cooperating means and cam means all being molded as an integral part of said housing and element.